United States Patent
Steffens et al.

(10) Patent No.: US 6,527,330 B1
(45) Date of Patent: Mar. 4, 2003

(54) FOLDING CARGO BAY COVER FOR PICKUP TRUCK

(75) Inventors: Charles J. Steffens, Ada, MI (US); Scott P. Crossman, Rockford, MI (US)

(73) Assignee: Steffens Enterprises, Inc., Grand Rapids, MI (US)

( * ) Notice: Subject to any disclaimer, the term of this patent is extended or adjusted under 35 U.S.C. 154(b) by 0 days.

(21) Appl. No.: 10/074,288

(22) Filed: Feb. 12, 2002

Related U.S. Application Data

(62) Division of application No. 09/488,252, filed on Jan. 20, 2000, now Pat. No. 6,422,635.

(51) Int. Cl.$^7$ ................................................. B60P 7/02
(52) U.S. Cl. ........................... 296/100.07; 296/100.09; 296/100.02
(58) Field of Search ........................... 296/37.6, 100.02, 296/100.03, 100.04, 100.05, 100.06, 100.07, 100.08, 100.09, 100.1; 292/57, 60, DIG. 29, 42, 43, 68, DIG. 60; 70/423, 455, DIG. 79, 408, 395, 396

(56) References Cited

U.S. PATENT DOCUMENTS

| | | | | |
|---|---|---|---|---|
| 340,620 A | * | 4/1886 | Russell, Jr. ................... | 70/100 |
| 2,002,818 A | * | 5/1935 | Jones .......................... | 70/408 |
| 3,514,152 A | | 5/1970 | Hermon | |
| 3,740,981 A | * | 6/1973 | Patriquin .................... | 439/142 |
| 4,154,072 A | * | 5/1979 | Flaschar ...................... | 70/455 |
| D279,473 S | | 7/1985 | Hochstetler et al. | |
| 4,709,567 A | * | 12/1987 | Appelbaum .................. | 70/455 |
| 4,747,441 A | | 5/1988 | Apolzer et al. | |
| 4,789,197 A | * | 12/1988 | Lewis .................... | 296/100.04 |
| 4,824,162 A | * | 4/1989 | Geisler et al. ................ | 16/269 |
| 4,844,531 A | | 7/1989 | Kooiker | |
| 4,901,963 A | | 2/1990 | Yoder | |

(List continued on next page.)

Primary Examiner—D. Glenn Dayoan
Assistant Examiner—Jason Morrow
(74) Attorney, Agent, or Firm—Warner Norcross & Judd LLP

(57) ABSTRACT

A cargo bay cover for a pickup truck including at least first and second parallel cargo bay panels hingedly mounted to a frame member spanning the cargo bay of the pickup. The cover includes a unique clamping bracket for attaching the frame member to the side rails of the pickup. A curved wind seal member is mounted on the top of the sides of the bed and includes a first seal mounted between the edge of the panels and the wind seal member, and a second seal mounted between the bottom surface of the panels and the wind seal member. The wind seal is mounted to a stake pocket of the truck with a universal stake-pocket mounting nut. The cover further includes lock mechanism recessed below the top surface of the cargo bay panel so that a key in the lock mechanism is below the top of the cover. The lock mechanism includes universal lock catch adjustable on two axes to hold the cover in a closed position. The tailgate is held closed with a tailgate latching assembly including a tailgate catch mounted to the cover panel proximate the tailgate and a resilient cover catch mounted to the tailgate. The catches resiliently engage each other when the cover is closed.

10 Claims, 16 Drawing Sheets

U.S. PATENT DOCUMENTS

| | | | |
|---|---|---|---|
| 4,946,217 A | | 8/1990 | Steffens et al. |
| 4,953,820 A | | 9/1990 | Yoder |
| 5,121,960 A | | 6/1992 | Wheatley |
| 5,248,542 A | | 9/1993 | Hinzpeter et al. |
| 5,251,950 A | | 10/1993 | Bernardo |
| 5,322,336 A | | 6/1994 | Isler |
| 5,350,213 A | * | 9/1994 | Bernardo .................... 160/133 |
| 5,487,585 A | | 1/1996 | Wheatley |
| 5,636,893 A | | 6/1997 | Wheatley et al. |
| 5,653,491 A | | 8/1997 | Steffens et al. |
| 5,688,017 A | * | 11/1997 | Bennett ................. 296/100.17 |
| 5,860,691 A | | 1/1999 | Thomsen et al. |
| 5,931,521 A | | 8/1999 | Kooiker |
| 6,000,744 A | | 12/1999 | Kooiker |
| 6,024,402 A | | 2/2000 | Wheatley |
| 6,059,350 A | | 5/2000 | Kooiker |
| 6,082,806 A | * | 7/2000 | Bogard .................. 296/100.06 |
| 6,135,527 A | | 10/2000 | Bily |
| 6,170,900 B1 | * | 1/2001 | Kooiker ................. 296/107.04 |
| 6,227,602 B1 | | 5/2001 | Bogard |
| 6,234,560 B1 | * | 5/2001 | Hunt ..................... 296/100.03 |
| 6,257,640 B1 | * | 7/2001 | Leitner ....................... 224/404 |
| 6,264,266 B1 | | 7/2001 | Rusu et al. |
| 6,276,735 B1 | | 8/2001 | Champion |
| 6,325,439 B1 | | 12/2001 | Crossman |
| 6,338,520 B2 | | 1/2002 | Rusu et al. |
| 6,340,194 B1 | | 1/2002 | Muirhead et al. |
| 6,343,828 B1 | * | 2/2002 | Young et al. .......... 296/100.04 |
| 6,382,699 B1 | | 5/2002 | Hanson |

* cited by examiner

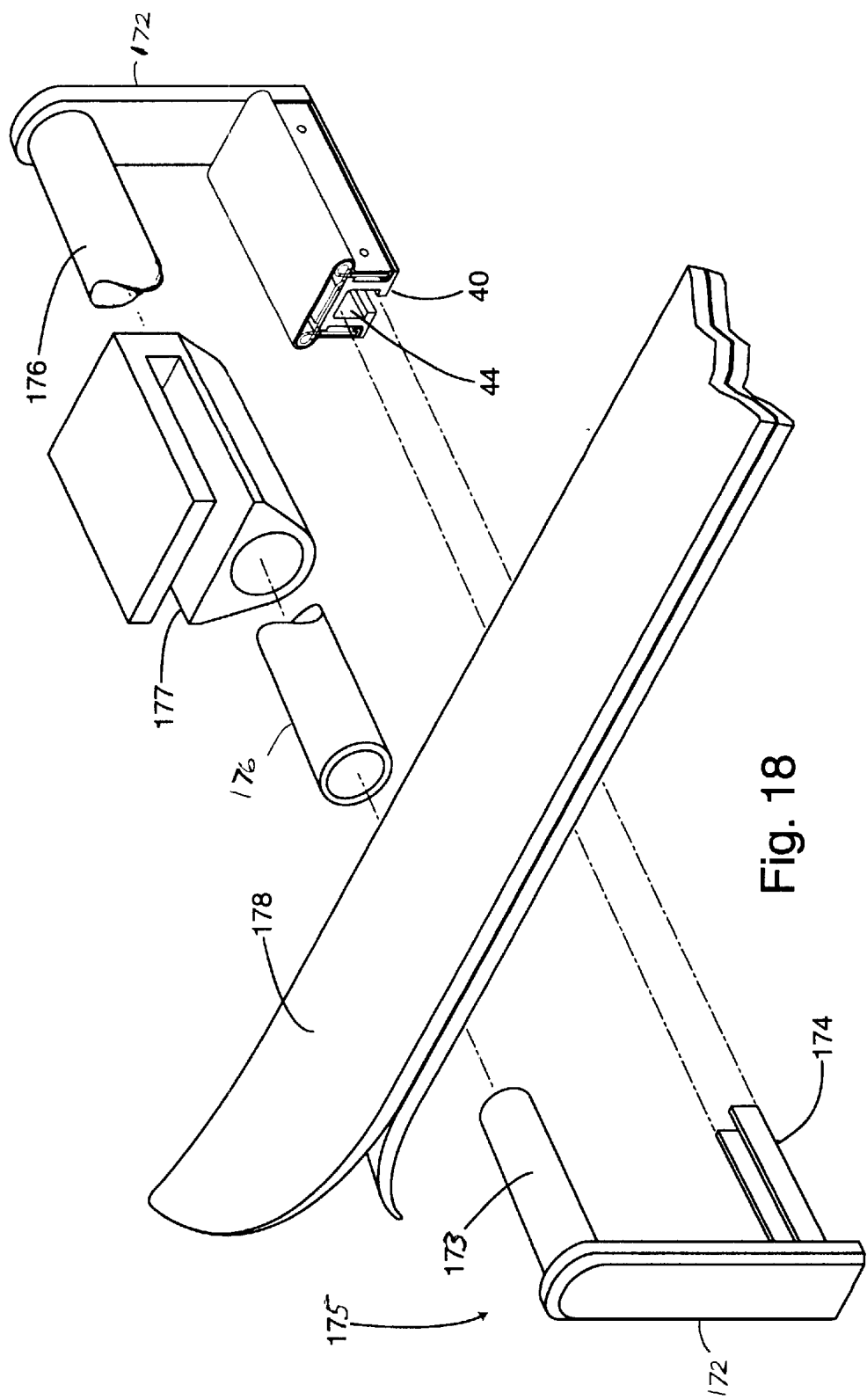

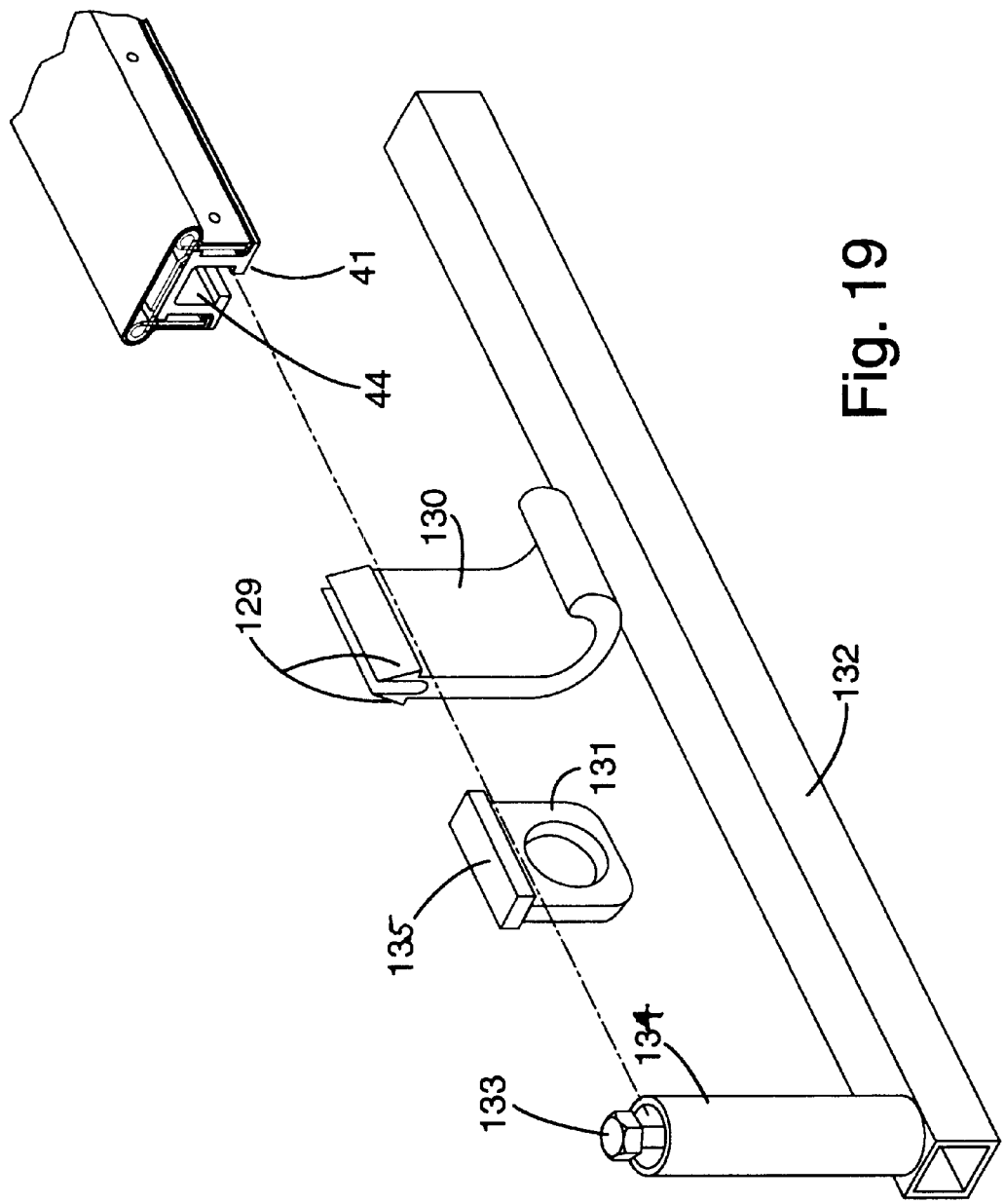

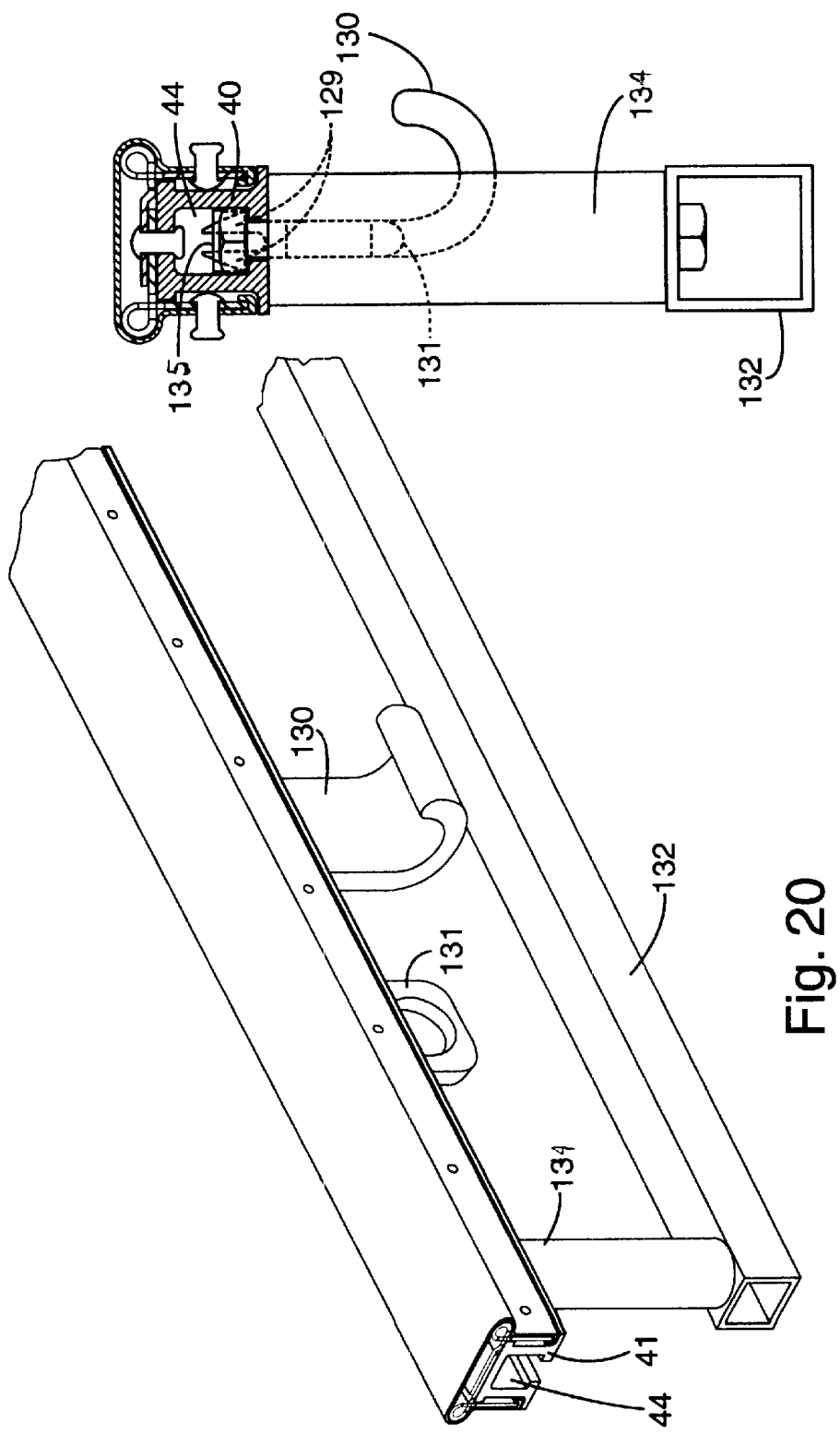

FOLDING CARGO BAY COVER FOR PICKUP TRUCK

This is a division of application Ser. No. 09/488,252, filed Jan. 20, 2000 (now U.S. Pat. No. 6,422,635).

BACKGROUND OF THE INVENTION

The present invention relates to a cargo bay cover for a pickup truck, and more particularly to a cover including a plurality of rigid panels which may be folded and unfolded to uncover and recover the cargo bay.

The cargo bay of a conventional pickup truck is open, and therefore the contents are unprotected from the weather and are exposed to view. This is a problem in the case of various types of cargo. This problem has been addressed in a number of ways. One solution disclosed in U.S. Pat. No. 5,653,491 to Steffens et al is to provide a cover including a plurality of low-silhouette panels which are relatively lightweight and can be quickly and easily folded, one upon the other, accordion style, to gain access or expose the cargo bay, and unfolded quickly and easily to cover the cargo bay. The panels are configured so that the panel adjacent the cab of the truck is hingedly mounted directly to the second panel next furthest from the cab. The first two panels are typically secured to a hinge having a single-plated strap or flange extending downwardly into the cargo bay. This flange is attached to a mounting bracket that is itself attached to the truck. Unfortunately, the prior structure does not provide the support required or desired for certain applications. If tool boxes or the like are installed within the pickup bed (under the covers) a separate support structure is necessary.

The prior art cargo bay cover also includes a wind and water guard which extends along the side of the truck adjacent the ends of the panels. The wind and water guard prevents the ends of the panels from being lifted off the sides of the truck by cross winds. The guard is generally L-shaped with a flexible seal extending upward from the base portion of the L. This seal prevents water from entering the cargo bay under the edges of the panels. Unfortunately, water can get past the seal under certain circumstances. The guards are typically attached to the side rails of the cargo bay by drilling a hole through the tops of the side rails and putting a bolt or screw through these holes. This requires precision drilling and subjects the sheet metal around the holes to rusting.

Additionally, the cargo bay cover of the prior art includes a lock mechanism to allow the operator to lock down at least one of the panels to secure the contents of the cargo bay. These locks typically include a lock mechanism having a keyhole that is flush with the top of the panel in which it is mounted. Accordingly, keys left in those mechanisms are subject to being broken off in the lock if the panels are folded shut, one on top of the other. The key may also be broken should an item placed on the cover panel accidently slide across the panel and strike the key. Further, the key is a flag to potential thieves. Accordingly, the operator preferably should remove the key from the lock so that third parties do not know that the lock may be opened. The catches associated with prior art lock mechanisms that register with the side rails of pickup truck beds also are difficult to adjust, making installation of the lock mechanism time consuming.

Further, prior art tailgate catches include a hook attached to the tailgate and a loop feature attached to the cover panel to secure the cover panel to the tailgate. While providing travel security, water may still enter under the cover panel into the cargo bay. Additionally, unhooking the loop from the hook requires time and effort.

Finally, the prior art lock mechanisms can be rendered imperative by prying upward on one of the middle panels to "pull" the end panel away from the tailgate. Once a locked cover panel travels a sufficient distance on the side rails, the lock catches of the lock mechanism become misaligned and are disengaged, allowing unauthorized opening of all of the cover panels.

SUMMARY OF THE INVENTION

The aforementioned problems are overcome by the present invention wherein a multiple-panel cargo bay cover includes a structural support frame member that is mounted to the cargo bay walls, a dual-seal wind guard, a universal stake mounting nut, a recessed lock mechanism, a universal lock catch, a unique tailgate catch, and a quick-release frame member lock.

More specifically, the cargo bay cover includes a plurality of panels that fold upon one another accordion style. Preferably, the panel nearest the cab of the truck and the panel immediately adjacent and rearward from that panel are hingedly mounted in opposing fashion to an extruded frame member spanning the cargo bay from side to side. Other adjacent panels, for example, the panel nearest the tailgate and the next forwardmost panel, may also be mounted to a second frame member for added structural support and utility of the cargo bay cover. The frame member nearest the cab of the truck is mounted to the side of the pickup bed. The brackets used for mounting provide three axes of adjustment for the frame member and consequently the cover panels. Each adjacent panel is mounted to a frame member by a dedicated hinge. Preferably, the frame member is of a cross section that allows items such as hangers, brackets, or even tool boxes, to be suspended from the frame member, if desired. In applications utilizing two or more frame members, suspension brackets may be mounted below each of the frame members to cooperatively suspend items above the bed of the pickup. Additionally, brackets may be mounted on the upper side of the frame member to provide a mounting base for bike, ski, or material racks.

In a second aspect of the invention, a wind seal includes a dual-seal gasket to prevent moisture from entering the cargo bay from between the wind guard and the edges of the cargo bay panels.

In a third aspect, the wind seal is mounted to the side rail of the truck with universal stake rack mounting nuts that fit within the stake rack holes of the truck. This structure avoids drilling holes through the vehicle sheet metal.

In a fourth aspect, the lock mechanism of the cargo bay cover is designed so that the mechanism is recessed below the surface of the cover panel in which it is mounted. Accordingly, a key left in the lock mechanism is not obviously visible to passers-by. A lock cover is installed over the top of the lock recess to fully conceal the key.

In a fifth aspect, the lock mechanism includes a lock which provides at least two axes of adjustment of a lock catch to facilitate installation and alignment of the lock mechanism.

In a sixth aspect, a tailgate catch enhances security of the cargo bay by preventing linear travel of the cover and holding the tailgate in a closed position when the cargo bay cover panels are closed. The catch includes a tailgate mounted finger and a catch portion mounted to a panel that engages the finger to hold the tailgate closed with respect to the panel.

In a seventh aspect, the present invention includes a quick-release lock mechanism mounted to a frame member to provide easy removal of the cover while preventing linear travel of the panels.

These and other objects, advantages, and features of the invention will be more readily understood and appreciated by reference to the detailed description of the preferred embodiment and the drawings.

BRIEF DESCRIPTION OF THE DRAWINGS

FIG. 18 is an exploded view of the above-cover bracket assembly;

FIG. 19 is an exploded view of the under-cover bracket assembly and suspension structures;

FIG. 20 is a perspective view of the under-cover bracket assembly and suspension structures;

FIG. 21 is a side elevational view of the under-cover bracket assembly and suspension structures;

DETAILED DESCRIPTION OF THE PREFERRED EMBODIMENT

Figure 1:
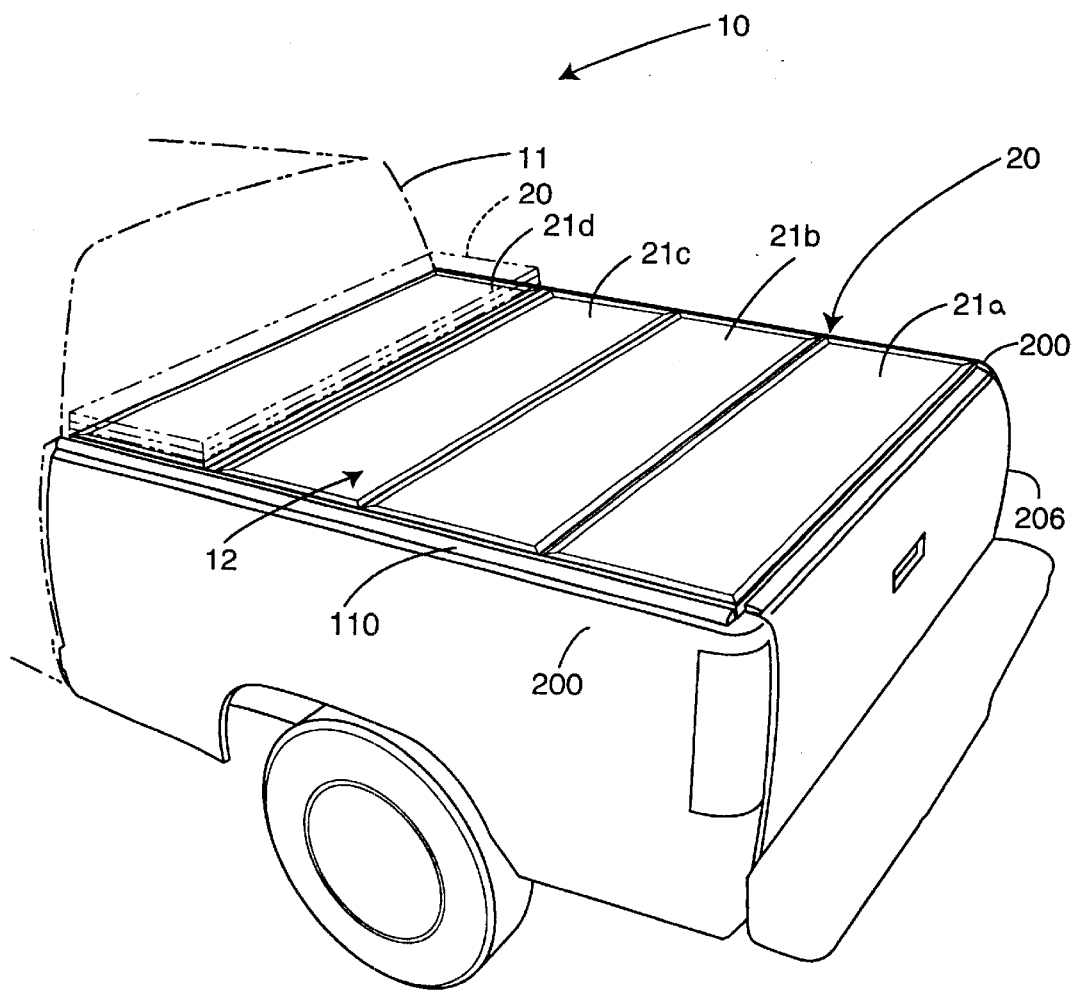
FIG. 1 is a perspective view of pickup vehicle with the cover of the present invention illustrated in an extended condition in solid lines and in a folded condition in broken lines.
Figure 2:
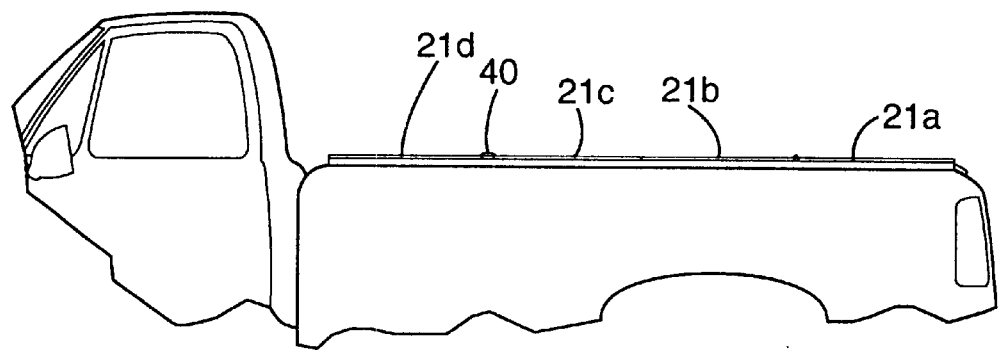
FIG. 2 is a side elevational view of the cover in extended condition.
Figure 3:
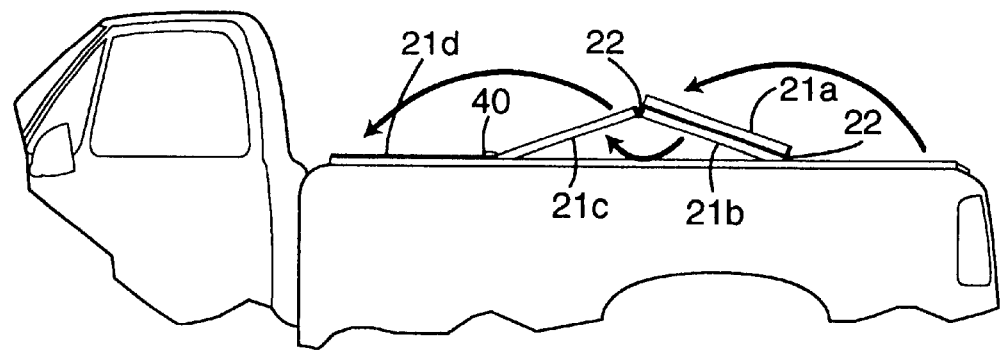
FIG. 3 is a side elevational view of the cover in a first folding configuration.
Figure 4:
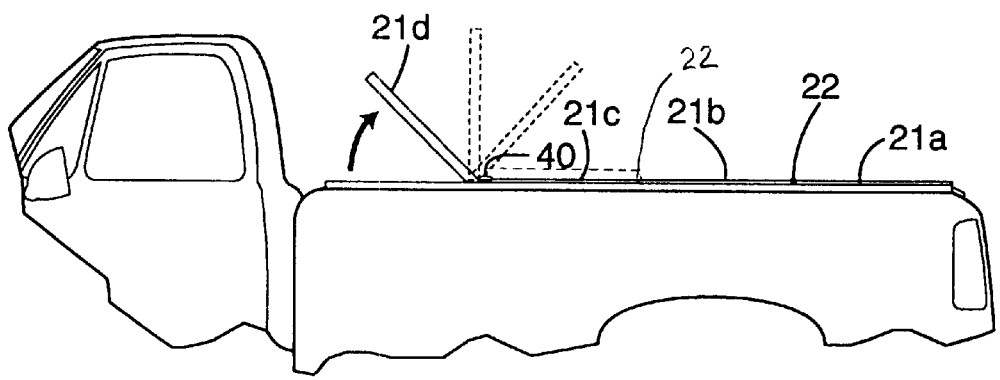
FIG. 4 is a side elevational view of the cover in a second folding configuration.

A foldable cargo bay cover according to a preferred embodiment of the present invention is illustrated in FIG. 1 and designated 20. The cover 20 is used in conjunction with a conventional pickup truck 10 having cab 11 and a cargo bed or area 12 having a pair of sides 200 and a fold down tailgate 206. The cover is mounted over the open top of the cargo space of the cargo bed. FIG. 1 illustrates the cover 20 in an extended or closed cargo space position in solid lines and a retracted or open cargo space position in broken lines. The cover 20 consists of several, preferably four identical panels 21a, 21b, 21c and 21d. Alternatively, the cover may consist of as few as two panels. As depicted in FIGS. 3 and 4, panels 21a and 21b, and 21b and 21c are joined together at hinges 22 about which the leaves of the hinge pivot. As best seen in FIG. 3, the hinges 22 between panels 21a and 21b, and 21b and 21c are placed slightly below the lower surface of the panels, thus, adjacent panels fold in opposite directions. Panels 21c and 21d are joined together and pivot at frame member 40.

Figure 5:
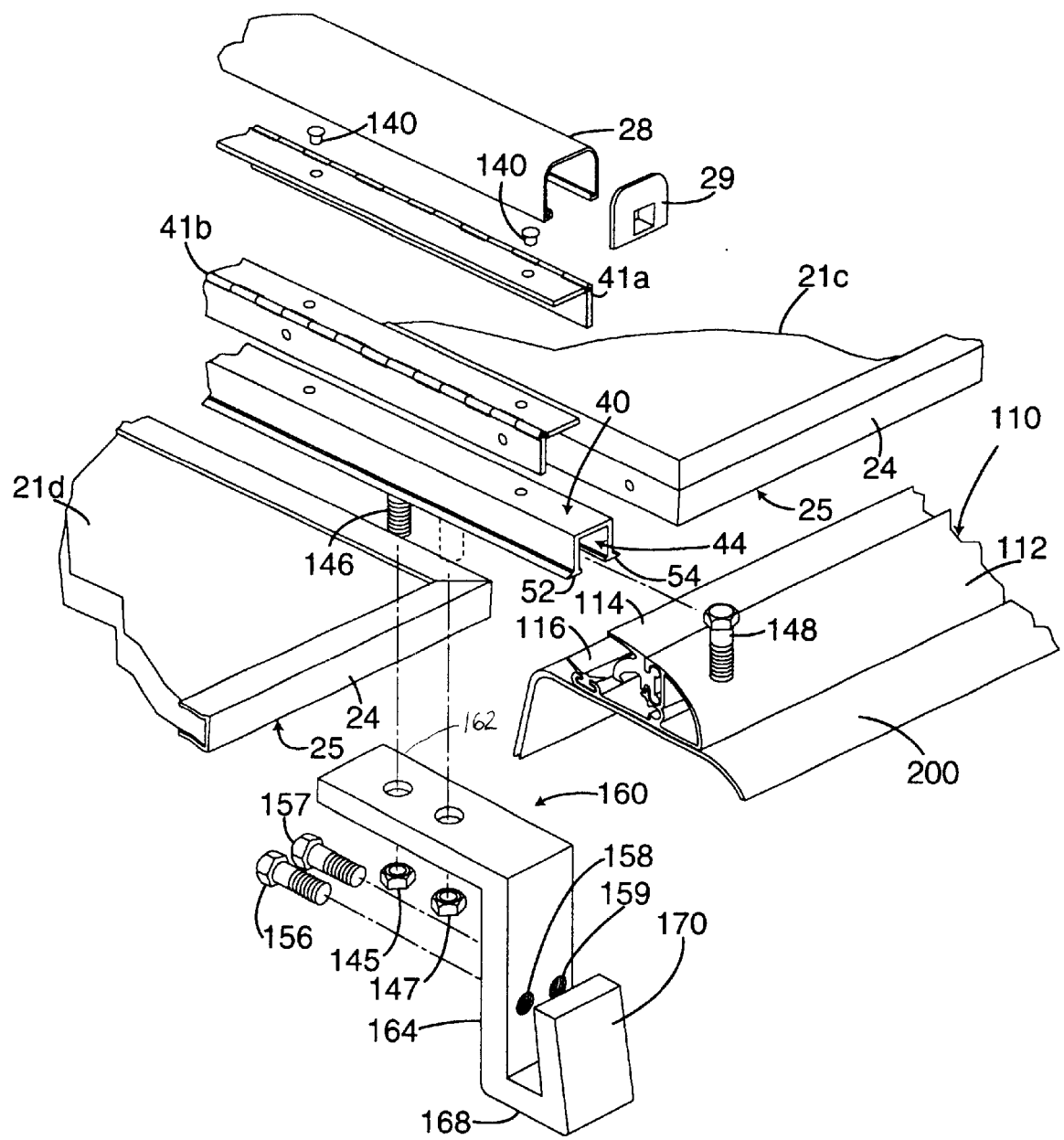
FIG. 5 is an exploded view of the frame member, wind seal and mounting bracket.
Figure 7:
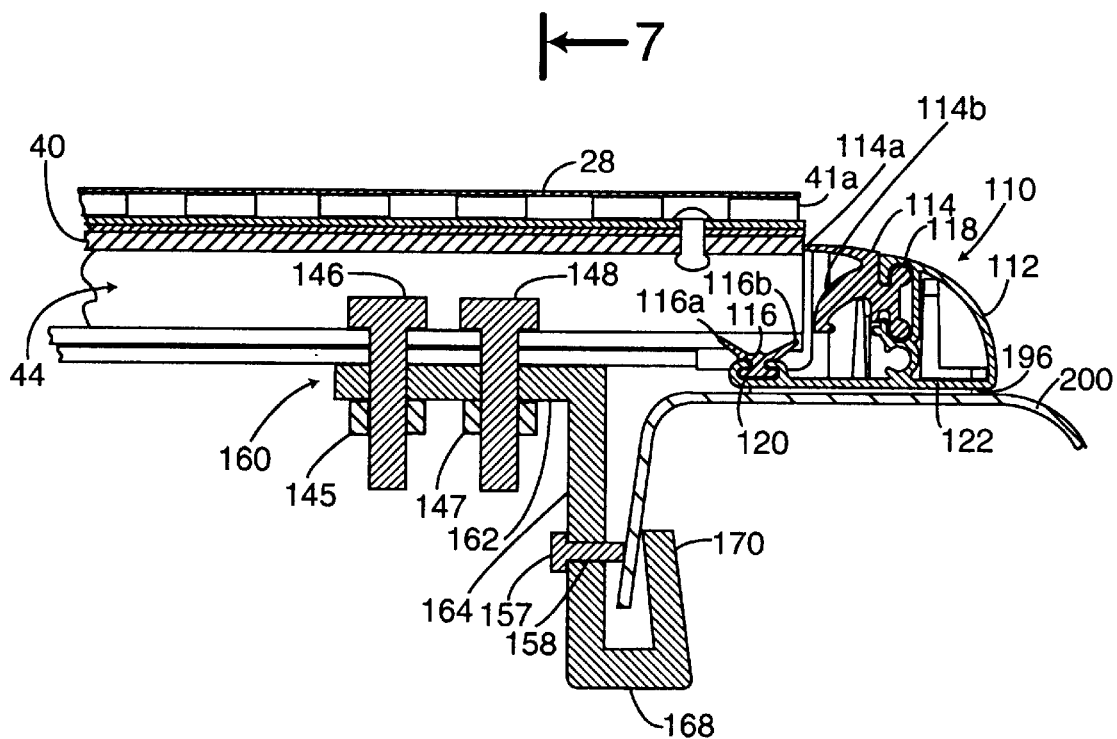
FIG. 7 is a sectional view of the frame member, wind seal and mounting bracket taken along lines 7—7 of FIG. 6.
Figure 12:
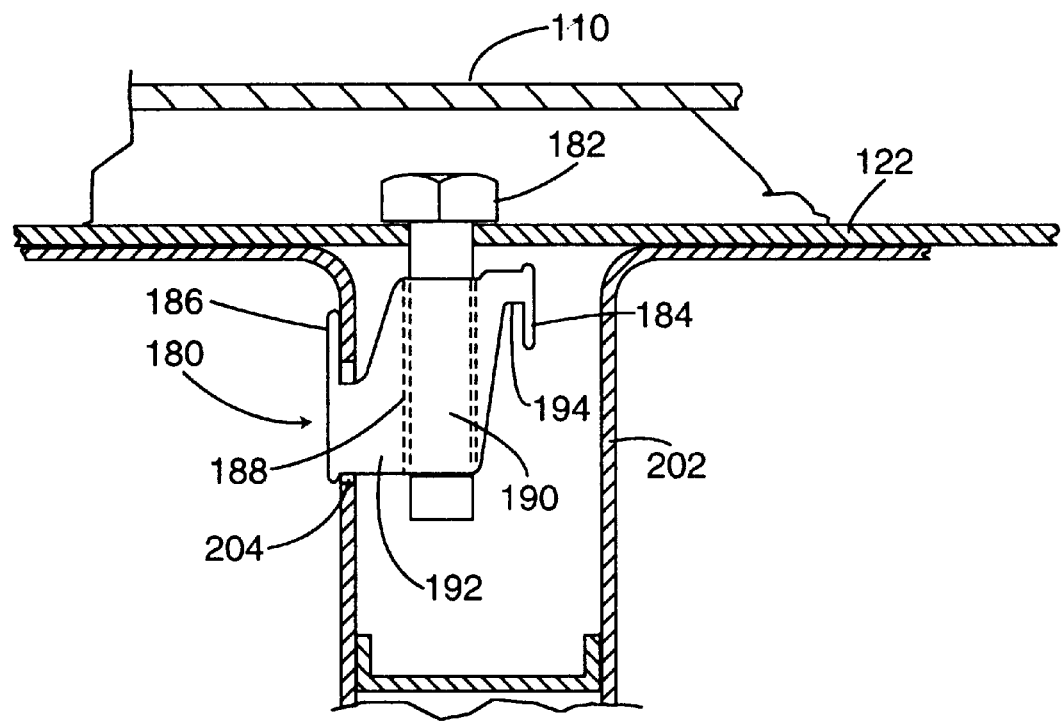
FIG. 12 is a sectional view of the stake pocket nut taken along lines 12—12 of FIG. 11.

As best depicted in FIG. 5, frame member 40 is generally U-shaped with slot 44 at the lowermost portion. Frame member 40 is preferably mounted between panels 21c and 21d to allow access to toolboxes or other items at the front of the truck bed. Optionally, second and third frame members may replace one or both of hinges 22 to add structural support to the cover panels 21a, 21b, 21c and 21d, and provide additional component mounting structures as discussed in further detail below. In the preferred embodiment, bracket 160 clamps onto side rail 200 to attach the frame member 40 between panels 21d and 21c to the truck bed. As seen in FIGS. 5 and 7, wind seal 110 includes an edge cover seal 114 and a lower panel seal 116 to provide dual liquid sealing around the edges of panels. Wind seal 110 is mounted to the side rail 200, as depicted in FIG. 12, with a bolt cooperatively threaded into universal stake pocket nut 180 which fits stake pockets having different sized and spaced stake pocket mounting holes 204.

Figure 15:
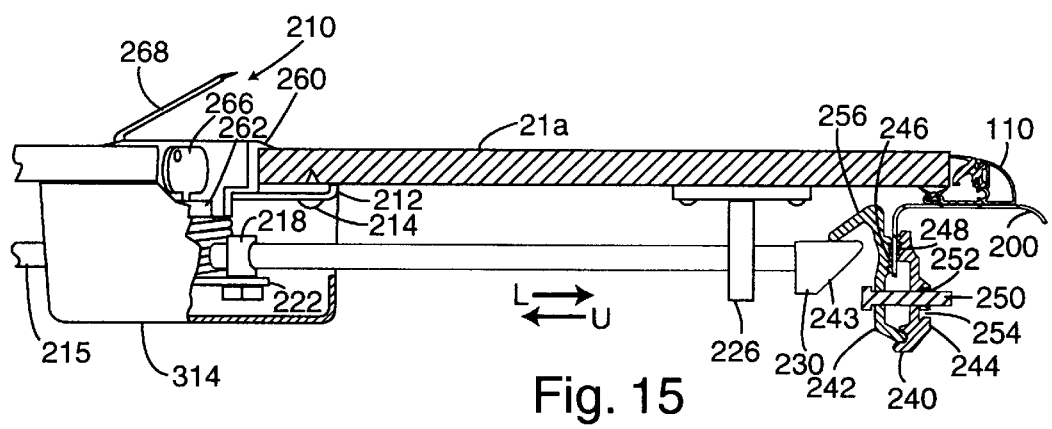
FIG. 15 is a sectional view of the lock mechanism.
Figure 16:
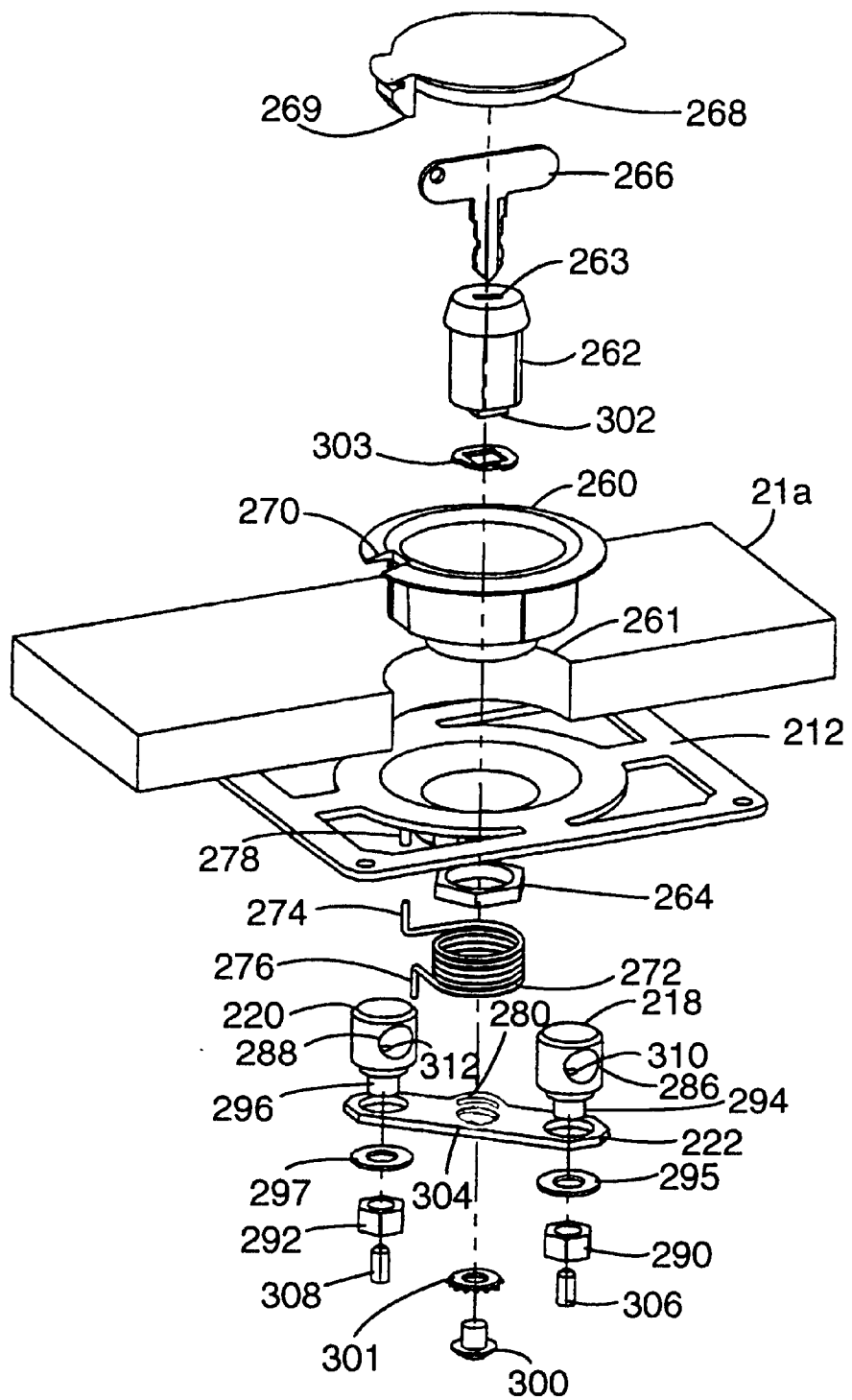
FIG. 16 is an exploded view of the lock mechanism.
Figure 17:
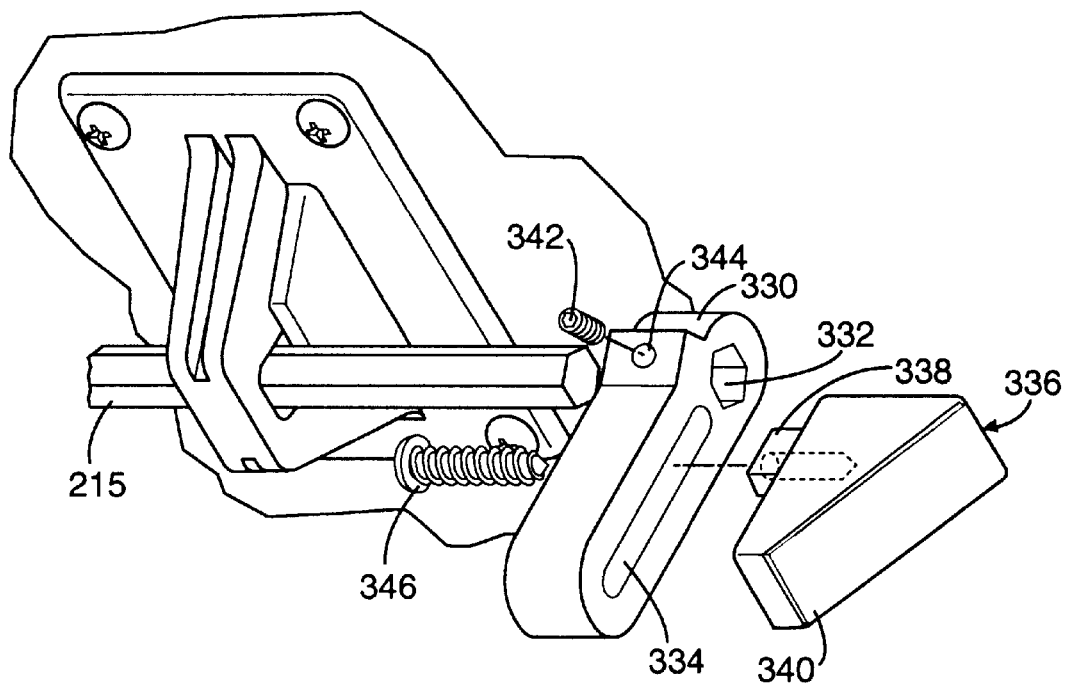
FIG. 17 is an exploded view of the adjustable lock catch.

FIGS. 15 and 16 depict the recessed lock mechanism 210 of the present invention wherein the top lock plate 260 includes a recess in which lock cylinder 262 is mounted. Accordingly, when inserted in its keyhole 263, key 266 does not protrude above the top of the top lock plate 260. Illustrated in FIG. 17 is the adjustable lock catch capable of being adjusted along two axes to facilitate installation and alignment of the lock mechanism.

Figure 13:
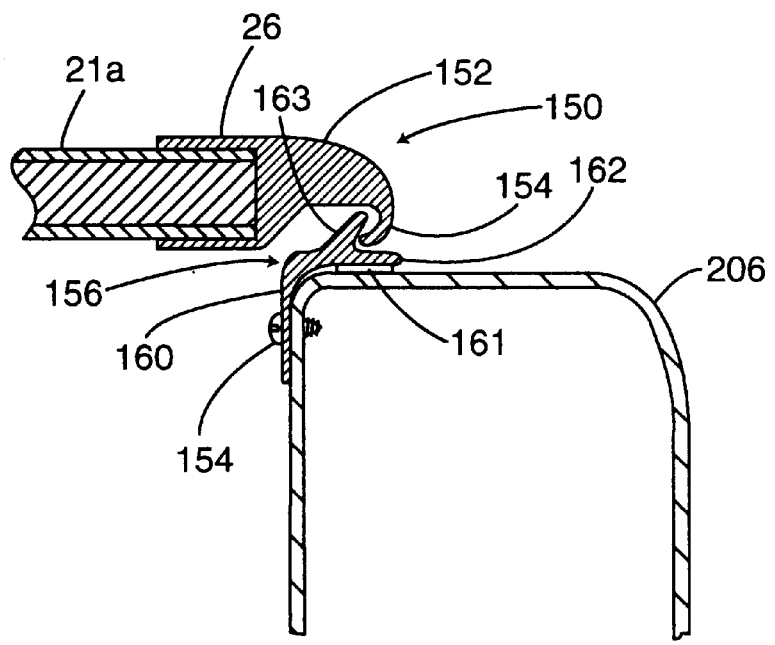
FIG. 13 is a sectional view of the tailgate catch.

As best depicted in FIG. 13, the tailgate latch of the preferred embodiment includes a catch body 152 mounted to cover panel 21a. The catch body 152 has a catch 154 that resiliently engages flange, or finger, 163 which is integrated with tailgate member 156.

Depicted in FIGS. 22–25 are alternative mechanisms for releasably securing frame member 40 to the side rails 200 of pickup bed to facilitate expedient installation and removal of the cargo cover.

Figure 10:
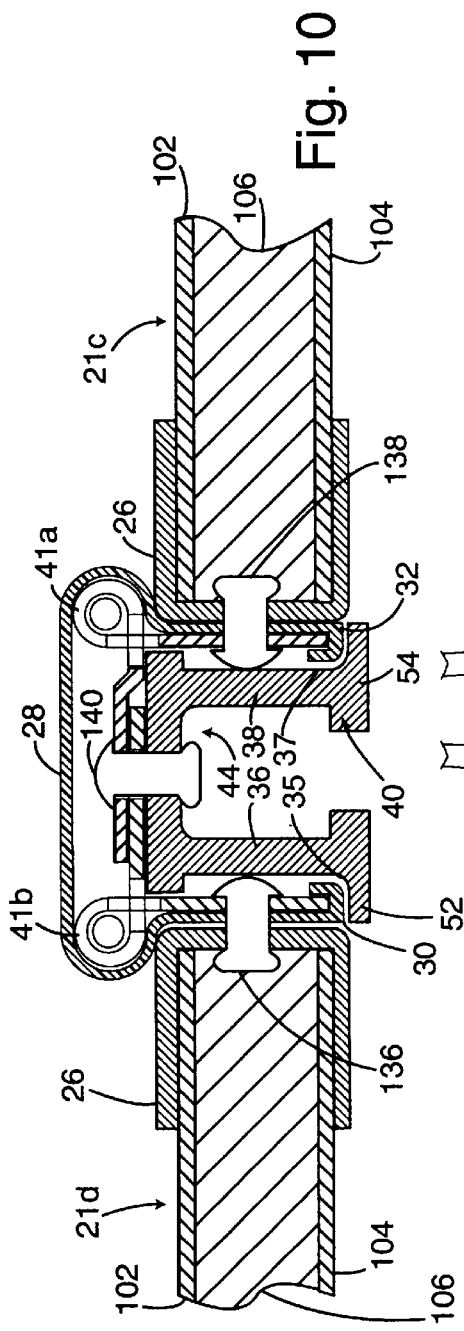
FIG. 10 is a sectional view of the frame member and panels.

Now, the present invention will be described in more detail. With particular reference to FIGS. 5 and 10, frame member 40 includes opposing hinges 41a and 41b about which panels 21c and 21d pivot. The hinges are secured to the covers by suitable fasteners such as screws, bolts, or rivets 136, 138, 140. Hinges 41a and 41b attach to frame member 40 above the member so that adjacent panels 21c and 21d may alternatively fold over upon each other as depicted in FIGS. 3 and 4. As depicted in FIG. 4, panel 21d pivots about hinge 41a of frame member 40 at least 180°, so that panel 21d may lie flat across panel 21c in a fully open position.

Figure 6:
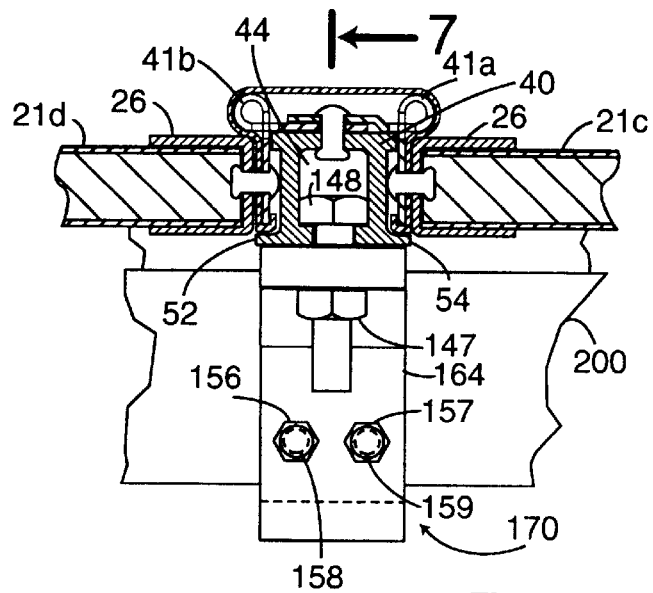
FIG. 6 is a sectional view of the frame member (wind seal omitted) and mounting bracket.

Referring to FIGS. 5–7, the frame member is generally U-shaped, or at least includes a slot 44. The ends of the frame member 40 may be covered with end seal 29 that fits into the slot 44 to prevent water from leaking into the cargo bay. Bolts 46 and 48 are received in the slot so that the hexagonal heads of those bolts cannot turn relative to the frame member 40. Accordingly, threaded nuts 45 and 47 may be threaded onto the bolts without manually holding the heads of bolts 46 and 48. Bolts or fasteners with alternative heads may be used that interfit within the slot and prevent rotation of the bolds or fasteners.

Depicted in FIGS. 5, 6, and 7, a J-bracket 160 is used to attach frame member 40 to side rail 200. The J-bracket effectively provides three axes of adjustment for the frame member; it may be moved vertically, horizontally, and forward and back along the side rails. The J-bracket 160 includes a bracket plate 162 that also mounts to the frame member 40 with bolts 146 and 148 threaded into receiving nuts 145 and 147. Optionally, a dampening device, such as a rubber or elastomers (not shown) may be mounted between the J-bracket 160 and the frame member 40 to prevent vibration. Such a dampening device may also be used in conjunction with the brackets of any of the other embodiments of the present invention, to prevent damage to the cover panels caused by excessive vibration. Integral with the clamp plate 162 is an outer plate 164, an inner plate 170 and a bridge plate 168 connecting the outer 164 and inner plate 170. Bolts 156 and 157 may be tightened within threaded apertures 158 and 159 to compress the side rail 200 between the inner 170 and outer plates 164 to attach the J-bracket 160 to the side rail 200 and securely mount frame member 40 to the side rail 200 without drilling holes in the side rail 200. The bracket may be constructed of aluminum steel, plastic, or any other suitable material.

As best depicted in FIG. 10, frame member 40 includes on its vertical walls 36 and 38 recesses 35 and 37 to accommodate fasteners, such as rivets 136 and 138, which protrude into the recesses. The rivets 136 and 138, fasten the leaves of the hinges to the panel frames 26. The opposing leaves of the hinges 41a and 41b are also attached to the frame member 40 with rivets 140.

Figure 11:
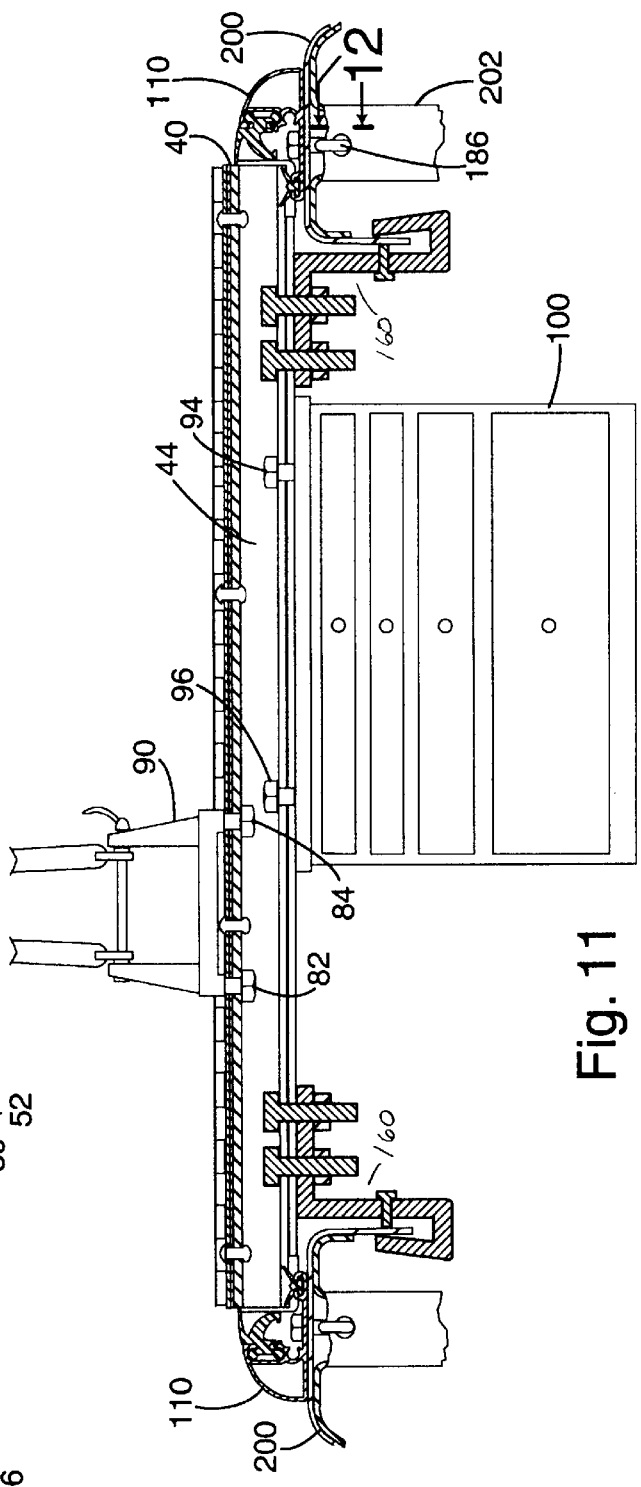
FIG. 11 is a sectional view of the frame member with articles mounted thereto, and a stake pocket nut.

With reference to FIG. 11, articles may be mounted to the frame member 40 that extends between side rails 200. A bolt or other fastener may be secured to frame member 40 to mount such articles. Rack bolts 82 and 84 fit through frame member 40 and thread into bike bracket 90 to hold the bracket 90 in place with respect to the frame member 40. The bracket 90 also may be a bracket associated with ski mounts, boat mounts, material mounts, or other mounts that provide a base upon which to mount articles above the cargo bay cover panels. As best depicted in FIG. 18, an over-cover bracket 175 may be coupled to the frame member. End tabs 174 of bracket end fitting 172 snugly interfit within slot 44 at both ends of frame member 40. Bracket end fitting 172 also includes rod holder 173 which interfits within bracket rod 176 to support the bracket rod 176 above the frame member 40. A variety of different mounting brackets, for example, ski bracket 177, may be mounted to the bracket rod 176 to support articles, such as skis 178, above the frame member 40.

As depicted in FIG. 11, articles, such as a toolbox 100 may be suspended from the frame member 40. Suspension bolts 94 and 96 may be threaded into the top of toolbox 100 to suspend the toolbox from the frame member 40. The suspension bolts 94 and 96 fit within, and are held in place by, the slot 44 of the frame member 40. As with reference to FIGS. 19 and 20, various other components are interfitted within slot 44 of frame member 40 to suspend articles from the frame member 40. Undercover rack 132 is suspended from frame member 40 by bolt 133. The distance between the frame member 40 and the undercover rack 132 is regulated by spacer 134, which may be of varying lengths to accommodate different spacing between the rack 132 and the frame member 40. Preferably, two or more undercover racks 132 are associated with two or more frame members 40 in the bed of a truck so that items of substantial length may be placed and suspended above the racks 132, and consequently above the bed of the truck. Alternatively, a planar sheet (not shown) may be suspended on two or more cooperating undercover racks 132 to form a shelf below the cargo bay cover.

With reference to FIGS. 19, 20, and 21, other components are used to suspend articles from frame member 40. Tie-down 131 slides into slot 44 and may be used to provide a suspension point. Hook 130 snap fits into slot 44 to provide a point of suspension to hang articles such as grocery bags, tool belts, electric cords, and the like from the frame member 40. FIG. 21 depicts the interfitting of hook 130 into the slot 44. Hook 130 includes resilient prong tabs 129, which flex toward one another when an installer pushes the tabs 129 upwards into slot 44. Once fully inside the slot, the tabs flex outward to lock the hook 130 in fixed registration with the frame member 40. FIG. 21 also depicts the slide-in block 135 of the tie-down 131 which registers the tie-down within the slot 44. Installation of the slide-in block 135 requires removal of the frame member 40 from any mounting brackets 40 so that the slot 44 is fully accessible. Obviously, the resilient tabs or slide-in detail may be used in conjunction with other support structures to register those structures with frame member 40. Other fastening configurations, for suspending such articles from the slotted frame member will be readily appreciated by those skilled in the art.

FIGS. 1, 5, and 7 best depict wind seal 110 displaced adjacent the cargo bay covers 21a, 21b, 21c, and 21d and secured to the top of the side rails 200. The rail includes a curvilinear surface 112 to improve aerodynamics and prevent catching of clothing or other items on the rail. The rail further includes edge cover seal 114 and lower panel seal 116. The edge cover seal 114 further includes dual seals 114a and 114b. These seals engage the edge of the cover panels 24 to provide a waterproof seal. The edge cover seal 114 fits into rail slot 118 to affix the edge cover seal 114 to the wind seal frame. The wind seal rail 110 is preferably made of extruded aluminum, however, other materials such as plastic, metal, and/or other materials, as are readily appreciated by those skilled in the art, may be substituted therefor. The lower panel seal 116 includes ribs 116a and 116b which provide dual sealing surfaces that abut the lower surfaces 25 of the individual panels for the length of the cargo bay. This lower panel seal 116 provides a secondary barrier should water or other liquid seep past the edge cover seal 114. Lower panel seal 116 is similarly secured to the wind seal 110 by interfitting within rail slot 120. The edge cover seal 114 and the lower panel seal 116 may be made from rubber, ethylene-propylene terpolymer (EPDM), or any other pliable and sealing composition. The wind seal 110 is preferably of uniform cross section for the length of the cargo bay.

The wind seal rail 110 also includes a base 122 which is adjacent the truck side rail 200. A secondary double-sided adhesive 196 is placed between the truck side rail 200 and the base 122 to adhere the wind seal 110 to the side rail, as well as provide additional sealing between the side rail 200 and wind seal 110. Other fasteners, such as bolts, screws or rivets may also be used to secure the wind seal 110 to the side rail 200.

As best depicted in FIG. 10, the panels are of the laminar construction have inner and outer sheets 102 and 104 and a core of rigid foam 106. The inner 102 and outer 104 sheets are preferably of aluminum and are bonded to the core 106. In the construction as illustrated, each panel is surrounded by C-frame 26 which protects the edge of the core and adds further rigidity to the panels. The frame 26 can be secured by suitable adhesives to both the facing sheets and the core which provides a panel having the thickness from about ⅔ of an inch to slightly more than 1 inch.

As seen in FIG. 10, to further resist moisture penetration between hinges 41a and 41b and the panels 21c and 21d, the hinges are exteriorly covered by flexible plastic jacket 28 made of rubber, plastic, EPDM, or other like material. This jacket 28 preferably has reversed flanges 30 and 32 along its edges to seat over and around the ends of the leaves of the hinges 41a and 41b. These flanges 30 and 32 positively anchor the longitudinal edges of the jacket to the hinge. The jacket 28, between the leaves of the hinges 41a and 41b, provides a water-tight seal at the edges of the C-frames 26 to prevent water from leaking into the cargo bay between frame member 40 and the C-frames 26 to provide a water-tight seal there between.

FIGS. 11 and 12 depict a unique stake pocket nut 180 provides easy fastening of a wind seal 110 to the cargo bay stake pocket 202. Within stake pockets of conventional pickup trucks, stake pocket holes 204 are provided; however, the distance of the stake pocket holes 204 from the side rail 200 of the truck, as well as the size of the holes 204, differ depending on the make and model of the pickup. Accordingly, a universal stake pocket nut 180 provides at least two configurations to facilitate attachment of wind seals 110 to the side rails 200. As best illustrated in FIG. 12, the universal stake pocket nut 180 includes a short flange 184, a long flange 186, and an internal bore 188 which is threaded to receive bolt 182. Shafts 192 and 194 connect long flange 184 and short flange 186 to the main body of the stake pocket nut 190. The long and short flanges 184 and 186 are sized so that they fit through apertures 204 and abut against the truck stake pocket 202. The bolt 182 and stake pocket nut 180 are typically made from steel, an alloy, or plastic.

As depicted in FIG. 13, the preferred embodiment of the cargo bay cover also includes a tailgate catch mechanism 150. The mechanism 150 includes an extruded catch body 152 having a catch protrusion 154 extending therefrom. Catch body 152 includes a C-frame 26 which clamps over individual panel 21a and may be adhered, riveted, or otherwise fastened thereto. The extruded tailgate catch mechanism 150 includes tailgate member 156. The tailgate member 156 includes a mounting plate 160 which is screwed to the tailgate 206 with screw 158. Integral with the mounting plate 160 is base plate 162 that includes a flexibly resilient flange or finger 163, protruding from the base plate 162 at an angle therefrom. The base plate 162 may be secured to the tailgate with a double-sided adhesive 161. Flange 163 protrudes from the top surface of the base point 162 and cooperatively engages catch protrusion 154 such that the tailgate 206 may be maintained in a closed position in relation to cover panel 21a. The components of the tailgate catch mechanism are preferably made from a resilient and partially flexible extruded plastic. Further, it is preferable that the components extend the full width of the tailgate 206.

Figure 14:
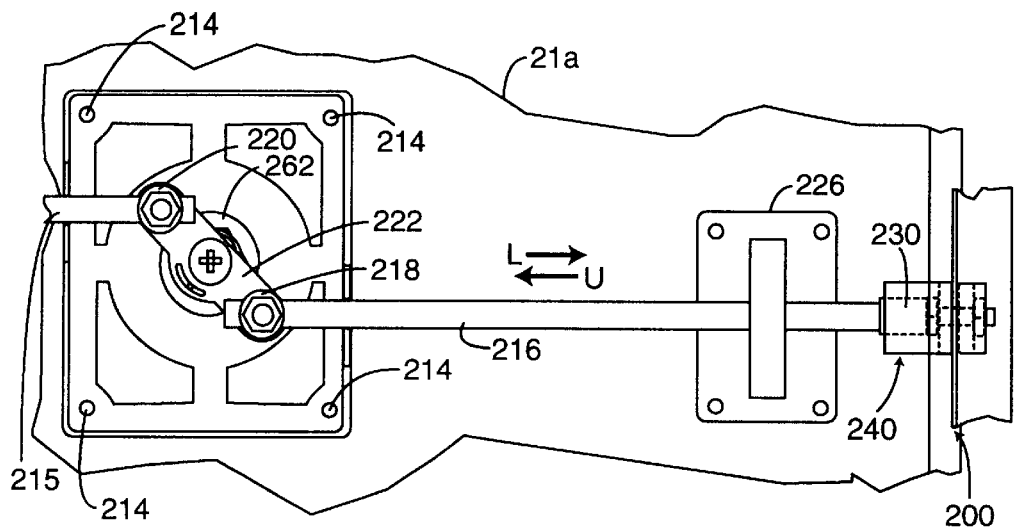
FIG. 14 is a top plan view of the lock mechanism.

Depicted in FIGS. 14, 15, and 16 is the preferred embodiment of the lock mechanism for the cargo bay panels. The lock mechanism, generally designated 210, is preferably mounted on cover panels 21a and 21d to provide a secure cargo bay cover. The lock mechanism 210 includes bottom lock plate 212 which is fastened to panel 21a by way of screws 214. The bottom lock plate 212 provides a platform on which to mount the lock mechanism 210. Optionally, lock cover 314 may be placed over the lock mechanism so that it will not be unnecessarily disturbed.

Throw rods 215 and 216 are interconnected to cam bushings 218 and 220 in a conventional manner. The cam bushings are further connected to the cam 222 which is mounted to the lock cylinder 262. A mirror replica of rod guide 226 and lock clamp 240 exist on the opposite side of the panel, but are not depicted in FIGS. 14 and 15 to preserve clarity. Throw rod 216 travels through rod guide 226, which insures the proper linear motion of the throw rod 216. The rod guide 226 is bolted or screwed or otherwise fastened to the cover panel 21a. At the end of the throw rod 216 opposite the cam bushing 218 is rod end 230 which is fastened to throw rod 216. The rod end 230 includes rod end incline 243. Lock clamp 240 includes outer 242 and inner 244 clamp pieces which are clamped to the truck side rail 200. Teeth 246 and 248 provide a surface that grips the side rail 200. Any other configuration that augments the gripping ability of the lock clamp 240 may be used. The inner 244 and outer 242 lock clamps are forced toward one another by tightening bracket bolt 250 into bracket nut 252, which is resistant to turning within slot 254 due to the interaction of the nut with the slot 254. The inner clamp 242 also includes a catch 256 protruding therefrom. The rod end 230 is positioned so that in a locked position it will engage catch 256 to prevent opening of the cover panel 21a.

With reference to FIG. 16 the lock mechanism is described in further detail. The lock mechanism 210 is mounted to panel 21a (shown cut away) so that top lock plate 260 fits within aperture 261 defined by the panel 21a. The lock cylinder 262 fits within the top lock plate 260 and is fastened in place with cylinder nut 264. In this configuration, the keyhole 263 is located at the bottom portion of a top lock plate 260 such that when key 266 is fully inserted into keyhole 263 of the lock cylinder 262, it does not protrude above the top lock plate 260, and remains out of sight. Dust cover 268 locks to the top lock plate at recess 270 with the dust cover latch 269. The dust cover 268 may be opened and closed with relation to the top lock plate 260.

The torsion spring 272 has prong ends 274 and 276, and is mounted over the lock cylinder 262. Prong end 274 fits into prong end holder 278 and prong end 276 fits into cam slot 280. Cam bushings 218 and 220 include internal bores 286 and 288 through which throw rods 215 and 216 (FIG. 14) are interfitted. Set screws 306 and 308 protrude through cam bushing holes 310 and 312 to provide a pivotal mounting point for each throw rod 215 and 216 (FIG. 16). The cam bushings 218 and 220 are held stationary relative to the cam 222 with cam bushings nuts 290 and 292 which are threaded onto the threaded portion of the cam bushings 294 and 296. The cam 222, and cam bushings 218 and 220 are concentric with the lock cylinder 262 to enhance mechanical energy transfer and reduce complexity of the mechanism. Washers 295 and 297 are placed between the nuts 290 and 292 and cam 222 to further secure the cam bushing nuts 290 and 292 to the threaded portion of the cam bushings 294 and 295.

Lock cylinder screw 300 secures the cam to the lock cylinder. Lock washer 301 may be positioned to the screw 300 and the lock cylinder 262. Socket 302 of the lock cylinder 262 is displaced over stop washer 303. The socket 302 engages the cam at aperture 304 which allows cam 222 to rotate about this coupling. Other alternative lock mechanisms may be used in the alternative from that described above, as long as the lock cylinder is positioned at the lower most portion of the top lock plate 260 such that the key 266 does not protrude above the top of the top lock plate.

With reference to FIG. 17, the adjustable lock catch 330 of the present invention provides two axes of adjustment. Lock catch 330 is mounted on throw rod 215. Throw rod 215 fits within aperture 332, defined by lock catch 330. Set screw 342 is threadedly received in set screw bore 344, and is tightened down to secure lock catch 330 to throw rod 215. In this configuration, lock catch 330 may be moved along throw rod 215 horizontally to multiple positions. The lock catch 330 further includes a longitudinal slot 334. Latch tab 338 fits within slot 334 to prevent the inclined latch 336 from rotating relative to the lock catch 330. A tape covering such as a teflon, high density polyethylene or like material to reduce friction is applied to the side wall of truck 200 (not shown) or the incline face of the latch 336 where the latch is slammed shut. Screw 346 is displaced through slot 334 to fasten into the inclined latch 336 attaching it to the lock catch 330. Multiple variations of the lock catch will be readily appreciated by those skilled in the art.

Operation

In operation, as depicted in FIGS. 5, 10, and 11, the frame member and cooperating clamp structurally supports panels 21c and 21d, while allowing them to pivot in relation to the frame member. With hinges 41a and 41b mounted above the member 40, panels 21c and 21d may alternatively fold over upon one another, as depicted in FIGS. 3 and 4. As shown in FIGS. 5, 6, and 7, frame member 40 is bolted to mounting bracket 160 which is itself clamped to the side rail 200. The configuration of the mounting bracket 160 allows three axes of movement in relation to the frame and side rails to optimize positioning of the frame member. For example, the frame member may be moved side to side relative to the bracket. The bracket and consequently the attached frame member may be moved up and down relative to the side rail. The mounting bracket and the frame member may be moved forward and back along the side rail.

The slot 44 of the frame member 40 facilitates the fastening of articles to the frame member. As depicted in FIGS. 11, 18, and 19, articles, such as toolboxes or support structures such as hooks 130, tie-downs 135 on support brackets 132 may be registered in the slot of the frame member. Additionally, as shown in FIGS. 11 and 18, items such as a bike rack 90, or an over-cover support bracket 175 may be mounted on the frame member.

The wind seal 110, as best depicted in FIGS. 5 and 7 includes multiple sealing mechanisms to prevent liquids from leaking into the cargo bay along the peripheries of the cover panels. Edge cover seal 114 includes two seal fins 114a and 114b which prevent water from seeping past the edge 24 of the cover panel while the panel is in a closed position. Further, lower panel seal 116 includes two fins 116a and 116b that abut the lower surface 25 of the cover panels to prevent any water that seeps past the edge cover seal 114 from entering into the cargo bay.

In operation, the stake pocket nut 180, as depicted in FIG. 12, allows a wind seal 110, or any other similarly railed item to be attached to the side rail of a truck 200. Stake pocket bolt 182 fits through an aperture in the wind seal 110 and protrudes into the truck's stake pocket 202. Bolt 182 is tightened into the internal threads 188 of the stake pocket nut 180. Depending on the distance of the stake pocket aperture 204 from the side rail 200, either the short flange or the long flange will be inserted into the aperture 204. Once the flange 186 is inserted into the stake pocket aperture 204, the bolt 182 is tightened down so that the stake pocket nut 180 engages the stake pocket 202 as depicted in FIG. 12 and secures the wind seal to the side rail 200.

With reference to FIGS. 14, 15, and 16, the operation of the lock mechanism will now be described. Dust cover 268 may be opened and key 266 inserted into the keyhole 263 lock cylinder 262. While in the keyhole 263, key 266 is not visible to passers-by, as it is fully concealed within the top lock plate 260. Turning the key 266 rotates stop 303. Stop 303 engages slot 280 to rotate cam 222. Torsion spring 272 provides resistance to that rotation by way of prongs 274 and 276 engaging prong end holder 278 and side surface of cam 222. Upon rotation of the cam, the cam, the cam bushings 220 and 218 concentrically rotate in a circular arc. Consequently, throw rods 215 and 216 move in a linear fashion in direction U. With this motion, rod end 230 is displaced so that it no longer engage catches 256 or alternatively the return lip of the side rail 200. The same action occurs on the other side of the panel, but for the sake of clarity, such action is not shown. Once the rod end 230 has moved in direction U sufficiently far to no longer engage catch 256, the panel may be opened.

Once the key 266 is released, the torsion spring rotates the cam counterclockwise such that the throw rods 215 and 216 move in direction L to a locked position. In this configuration, the cover panel may be slammed shut—with or without the key 226 in the keyhole 263. During the shutting action, rod end incline 243 will engage catch 256 such that the throw rod 216 (and 215 by similar action, not shown) is moved back in direction U until the rod ends clear the bottom portion of the catch 256. Upon clearing the catch, the torsion spring 272 will again rotate cam 222 counterclockwise so that throw rods 215 and 216 move in direction L to a locked position as depicted in FIG. 15. Because the key 266 is fully hidden from view within the top lock plate 260, particularly with the dust cover 268 closed, the key may be left in the keyhole 263 and still remain out of view.

Tailgate catch 150, as depicted in FIG. 13, acts to prevent the tailgate 206 from being opened when the cover panel 21a is closed. Flexibly resilient flange 163 engages catch protrusion 154 to hold the tailgate 206 closed. To open the tailgate 206, a user must lift the panel 21a so that resilient flange 163 will not engage the catch protrusion 154 while opening the tailgate 206. The tailgate catch 150 also holds the cover panel 21a in closed relation to the tailgate 206 during travel. Finally, the tailgate catch 150 prevents the unauthorized sliding forward and opening of the cover panels due to the engagement of the catch protrusion 154 by the flange 163.

Alternative Embodiments

Figure 8:
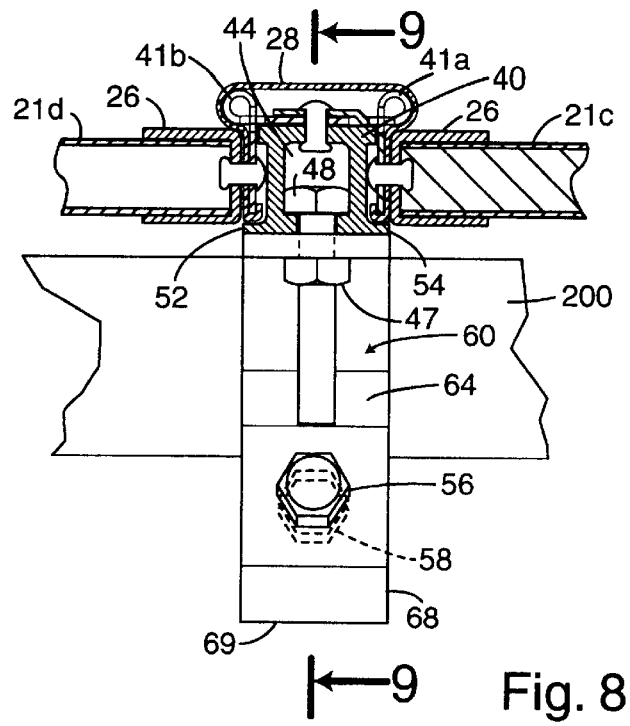
FIG. 8 is a sectional view of the frame member (wind seal omitted) and an alternative embodiment of the mounting bracket.
Figure 9:
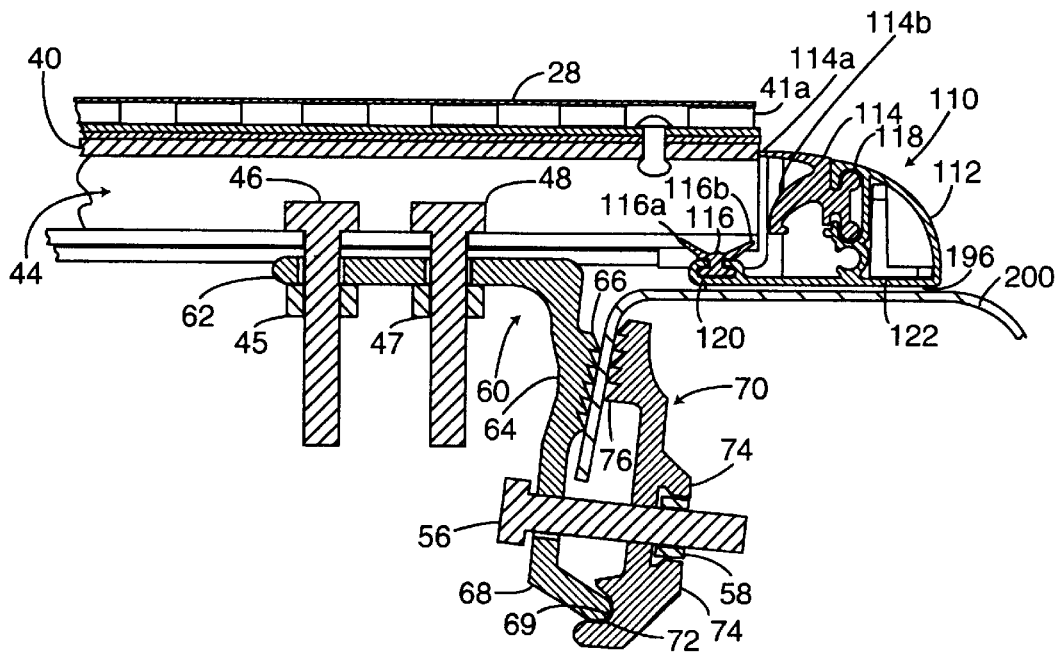
FIG. 9 is a sectional view of the frame member and an alternative embodiment of the mounting bracket taken along lines 9—9 of FIG. 8.

In a first alternative embodiment, as depicted in FIGS. 8 and 9, frame member 40 is secured to side rail 200 with clamp bracket 60. The frame member is attached to outer clamp bracket 60 via bolts 46 and 48 cooperating with nuts 45 and 47. Clamp bracket plate 62 abuts the flanged portions 52 and 54. Outer clamp plate 64 extends generally perpendicular to clamp bracket plate 62 and includes gripping teeth 66. The gripping teeth may be comprised as depicted with triangular teeth, however other sorts of gripping structures such as square teeth, rounded teeth, a coarse grated material or the like, may be affixed to the outer clamp plate 64 to provide a gripping surface.

Outer clamp plate 64 terminates at the fulcrum flange 68 which further includes Fulcrum bevel 69. Fulcrum bevel 69 seats within the fulcrum recess 72 associated with the inner clamp plate 70. The fulcrum recess 72 is designed such that outer clamp plate 70 pivots about fulcrum bevel 69. In application, the side rail of a cargo bay fits between the outer and inner clamp 60 and 70 and is gripped by gripping teeth 66 and 76 when bracket bolt 56 is tightened down with respect to bracket nut 58 whose rotational translation is prevented by keeper flanges 74. Keeper flanges 74 are designed to hold bracket nut 58, which may be located in an inaccessible position underneath the side rail of a cargo bed. Alternatively, the bracket nut 58 may be integrated with the inner clamp plate 70. The brackets may be constructed of aluminum, steel, plastic, or any other suitable material.

Figure 27:
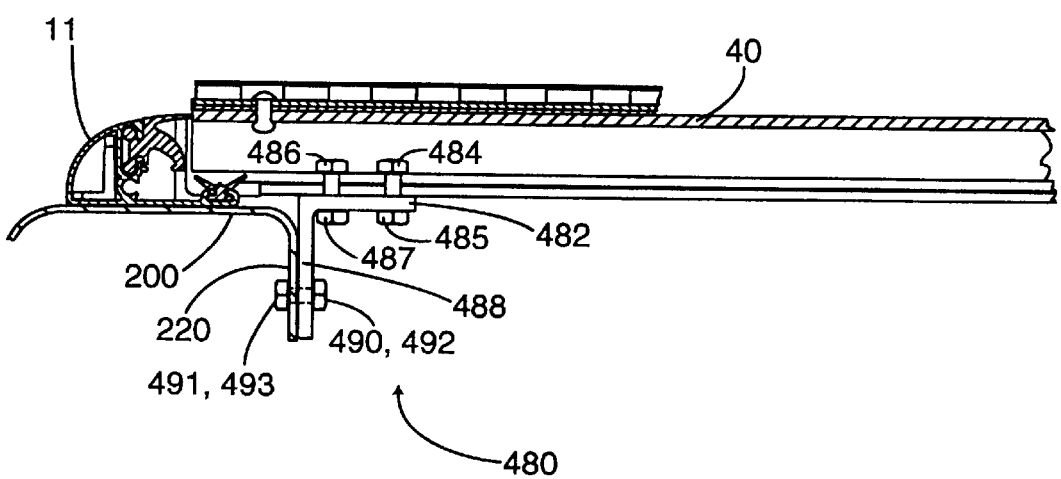
FIG. 27 is a sectional view of an alternative bracket and frame member.

In a second alternative embodiment, illustrated in FIG. 27, a simple bolt-on bracket may be used to fasten frame member 40 to the bed of the truck. Bolt-on bracket 480 includes base plate 482 bolted to frame member 40 with bolts 484, 486 and nuts 485, 487, respectively. Mounting plate 488 is bolted directly to the sheet metal of the pickup bed 220 with bolts 490, 492 and nuts 491, 493 respectively.

Figure 22:
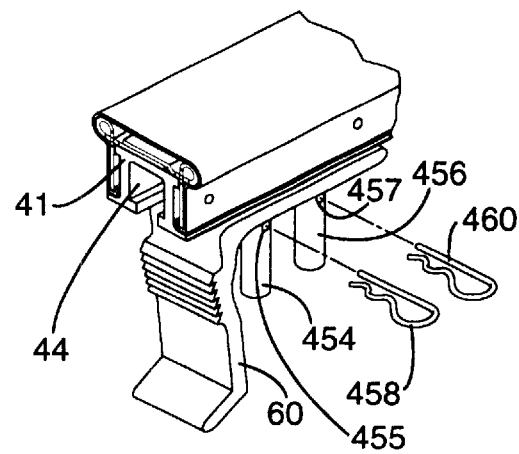
FIG. 22 is a side elevational view of the cotter key quick-release mechanism.

In a third alternative embodiment, depicted in FIGS. 22–25, the frame member is quick-release mounted to the mounting brackets to facilitate expedient removal of the cargo bay cover from the truck bed. With reference to FIG. 22, rather than have the bracket bolted to the frame member, bolt pins 454, 456 are mounted in slot 44. The pins 454, 456 extend through the bracket 60. Cotter keys 458, 460 or similar removable quick-release keys or pins fit through apertures 455, 457 in bolt pins 454, 456.

Figure 23:
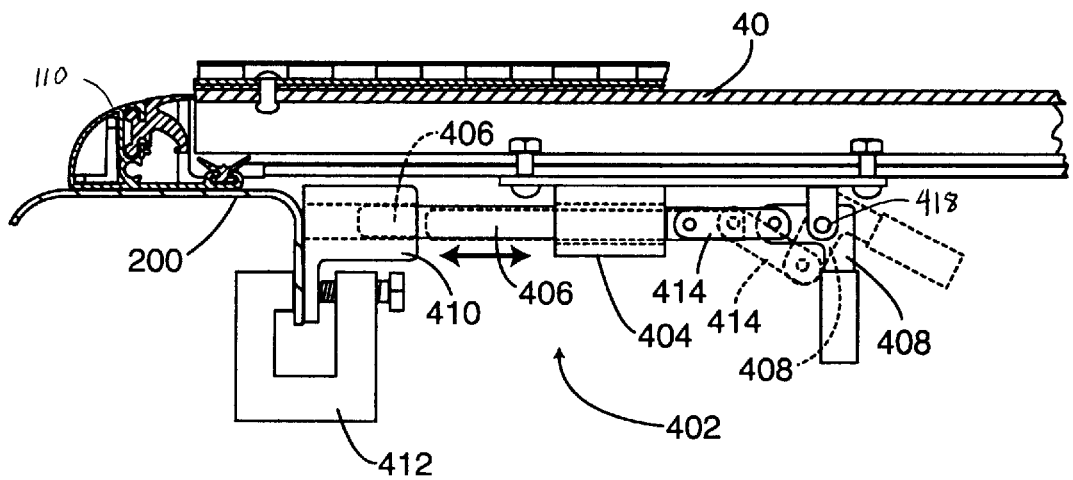
FIG. 23 is a side elevational view of the push-pull quick-release mechanism.

FIG. 23 depicts a push-pull style quick-release mechanism 402 for releasably mounting a frame member 40 to a side rail 200. The mechanism 402 includes a guide member 404, lock bolt 406, which slides within guide member 404, and engagement lever 408, all fastened to the frame member 40. Mounting block 410 is clamped to side rail 200 with C-clamp 412. Connector bar 414 couples engagement lever 408 to lock bolt 406. By moving engagement lever 408 arcuately about pivot pin 418, an operator may move locking bolt into and out of mounting block 410, to put the release mechanism into an engaged and disengaged configuration, respectively.

Figure 24:
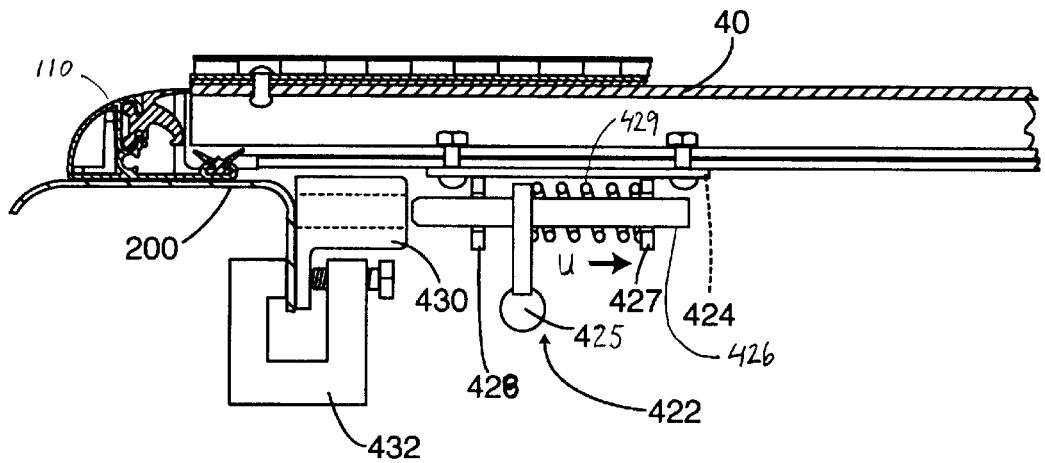
FIG. 24 is a side elevational view of the spring-bolt quick-release mechanism.

FIG. 24 depicts a spring loaded quick-release mechanism for releasably mounting a frame member 40 to a side rail 200. A mounting block 430 is clamped to side rail 200 with C-clamp 432. The spring loaded mechanism 422 includes a guide frame 424 mounted to the frame member 40. The guide frame 424 includes guide rings 427, 428 to guide lock bolt 426. Lock bolt 426 includes integral knob 425. Spring 429 provides bias between guide ring 427 and knob 425. Accordingly, lock bolt 426 registers within mounting block 430 to hold the frame member in locked position. To quick-release the frame member 40, an operator must move the knob 425 in direction U to bias the spring 429 and disengage the lock bolt 426 from the mounting block 430.

Figure 25:
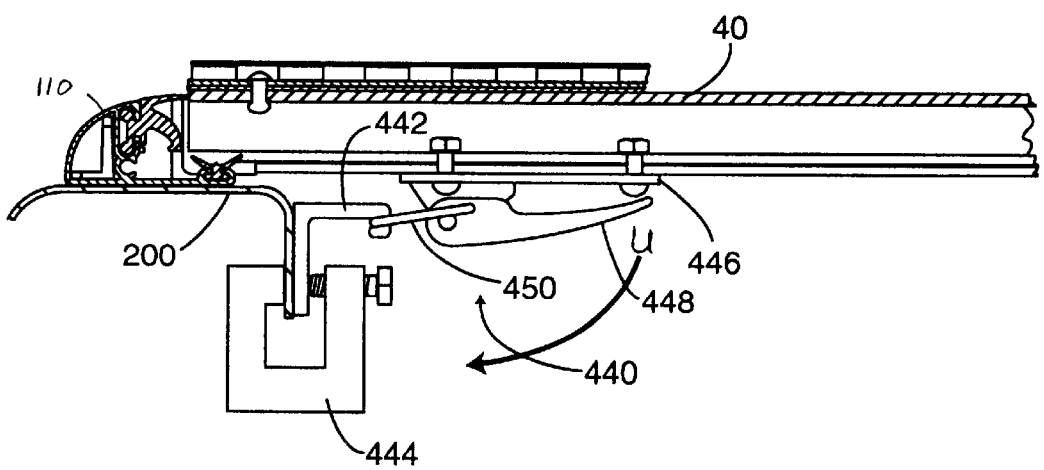
FIG. 25 is a side elevational view of the buckle-latch quick-release mechanism.

Illustrated in FIG. 25 is a buckle-latch quick-release mechanism 440 for releasably attaching frame member 40 to side rail 200. J-catch 442 is mounted to side rail 200 with C-clamp 444. Buckle frame 446 is mounted to frame member 40. An over-the-center style buckle-latch lever 448 is pivotally coupled to the buckle frame 446. Further pivotally coupled to the buckle-latch lever 448 is lasp 450, which engages J-catch 442 in locked mode to secure the frame member 40 to the side rail 200. To quick-release the frame member 40 from side rail 200, an operator lifts buckle-latch in direction U to disengage the lasp 450 from the J-catch 442.

Figure 26:
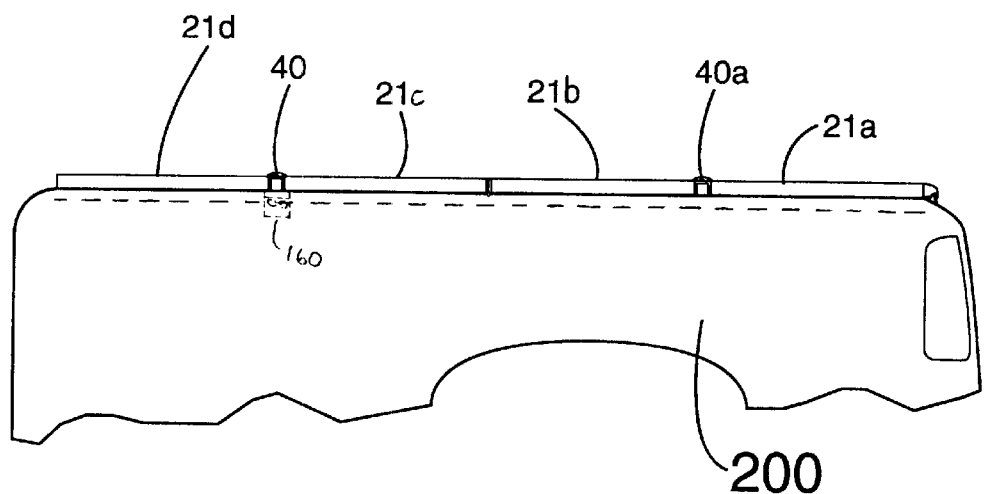
FIG. 26 is a perspective view of a multiple frame member cover panel configuration (wind seal omitted)

In a fourth alternative embodiment, at least two frame members are used to hingedly connect panels. As depicted in FIG. 26, one frame member 40 is placed between panels 21c and 21d and a second frame member 40a is positioned between panels 21a and 21b. The second frame member 40a is structurally and operationally similar to frame member 40 of the preferred embodiment; however, to allow the of the cargo bay covers to be folded open, the second frame member 40a is not bracket clamped down to the side rails of the bed. However, for added security, any of the above described quick-release lock mechanisms may be coupled to the second frame member 40a.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A lock mechanism for locking a cargo bay cover panel in closed relation to a cargo bay, comprising:

a cover panel having an upper surface and a lower surface, said cover panel defining a recess opening through said upper surface;

a key; and a lock assembly supported by said cover panel and located entirely substantially below said upper surface, said lock assembly defining a keyhole below said upper surface a sufficient distance so that said key when fully inserted in said keyhole is located entirely below said upper surface.

2. The lock mechanism of claim 1 comprising a top lock plate for mounting said lock cylinder to said cover panel, and a throw rod coupled to the lock assembly.

3. The lock mechanism of claim 2 further comprising a dust seal to cover said top lock plate.

4. The lock mechanism of claim 3 wherein said dust seal is hingedly secured to said top lock plate.

5. The lock mechanism of claim 1 wherein said lock assembly includes a lock cylinder concentric with a lock activation mechanism, said lock cylinder located entirely below said lower surface.

6. A lock mechanism for locking a cargo bay cover panel in closed relation to the cargo bay comprising:

a cover panel having an upper surface, said cover panel defining a recess opening through said upper surface;

a key;

a lock assembly defining a keyhole configured to receive said key, said lock assembly coupled to said cover panel and located below said upper surface within said recess so that said key is located entirely below said upper surface when said key is fully inserted in said keyhole;

a throw rod coupled to said lock assembly, said rod including an angled end, said end selectively adjustable in two non-parallel planes to fixed positions in relation to the throw rod; and a catch secured to the cargo bay adapted to engage said end when the cover panel is slammed shut so that the cover panel attains a locked mode.

7. A lock mechanism for locking a cargo bay cover panel in closed relation to a cargo bay, comprising:
   a cover panel;
   a lock assembly supported by said cover panel; and
   a lock catch coupled to said lock assembly, said lock catch selectively adjustable in two non-parallel planes to position-said lock catch in a desired fixed orientation relative to said lock assembly whereby the lock catch is capable of accommodating multiple cargo bays of different dimensions.

8. The lock mechanism of claim 7 wherein said lock assembly includes a throw rod, said lock catch is slidably mounted on said throw rod and said lock catch includes an element that locks said lock catch in a fixed horizontal position along to said throw rod.

9. The lock mechanism of claim 7 wherein said lock catch includes a vertical element, and said lock catch defines a slot, said vertical element slidably mounted within said slot, said lock catch including a vertical securing member that locks said vertical element in a fixed vertical position.

10. The lock mechanism of claim 9 wherein said vertical element includes a guide tab that interfits within said slot to prevent rotation of said vertical element.

* * * * *

UNITED STATES PATENT AND TRADEMARK OFFICE
CERTIFICATE OF CORRECTION

PATENT NO.    : 6,527,330 B1                                    Page 1 of 1
DATED         : March 4, 2003
INVENTOR(S)   : Charles J. Steffens et al.

It is certified that error appears in the above-identified patent and that said Letters Patent is hereby corrected as shown below:

<u>Column 13,</u>
Line 7, delete "-" after "position"

Signed and Sealed this

Thirteenth Day of May, 2003

JAMES E. ROGAN
*Director of the United States Patent and Trademark Office*